United States Patent [19]
Spector

[11] Patent Number: 5,600,628
[45] Date of Patent: Feb. 4, 1997

[54] COMPACT DISC ALBUM

[76] Inventor: Donald Spector, 380 Mountain Rd., Union City, N.J. 07080

[21] Appl. No.: 945,408

[22] Filed: Sep. 16, 1992

Related U.S. Application Data

[63] Continuation-in-part of Ser. No. 821,062, Jan. 16, 1992, abandoned, which is a continuation-in-part of Ser. No. 701,078, May 16, 1991, Pat. No. 5,090,561.

[51] Int. Cl.⁶ .......................... G11B 23/03; B65D 85/57
[52] U.S. Cl. ..................... 369/291; 206/308.1; 206/312
[58] Field of Search .................................... 369/291, 273, 369/308.1; 360/133; 206/444, 313, 312

[56] References Cited

U.S. PATENT DOCUMENTS

| 1,121,239 | 12/1914 | Fuller | 369/273 |
| 3,430,761 | 11/1966 | Pelkey | 369/273 |
| 5,016,241 | 5/1991 | Lee et al. | 369/273 |
| 5,188,229 | 2/1993 | Bernstein | 206/312 |

FOREIGN PATENT DOCUMENTS

| 2059666 | 4/1981 | United Kingdom | 369/273 |

Primary Examiner—Robert S. Tupper
Assistant Examiner—Paul J. Ditmyer
Attorney, Agent, or Firm—Michael Ebert

[57] ABSTRACT

A protective package in an album format for a compact disc having a recording on one side thereof, the other side being unrecorded. The album is defined by interhinged rectangular front and rear cover panels of cardboard or other flexible material. Secured to the inner surface of the rear panel is a face panel having a circular opening die cut therein which is backed by the rear panel to create a well in which the compact disc is nested, with its recorded side lying against the rear panel, the unrecorded side being flush with the exposed surface of the face panel. When the front cover panel is folded over to close the album, the compact disc is then surrounded by the face panel and is sandwiched between the front and rear cover panel and is thereby fully protected. To remove the compact disc from the album, the front cover panel is unfolded and the rear cover panel is flexed to pop out the disc.

7 Claims, 2 Drawing Sheets

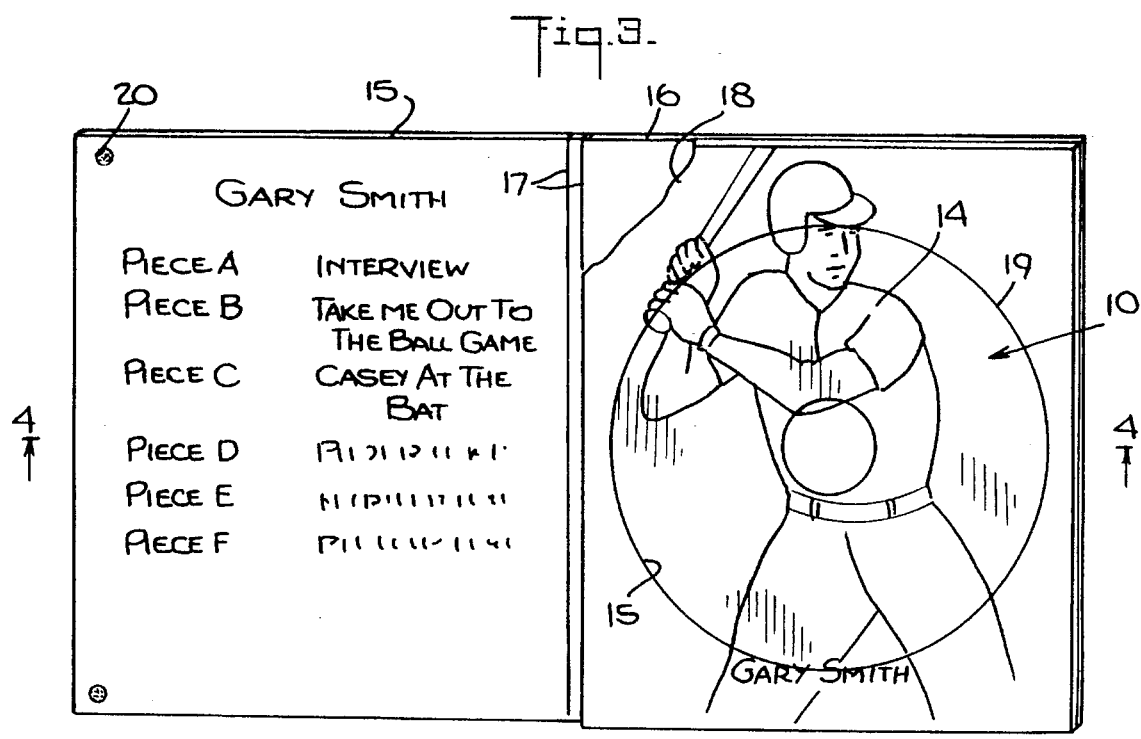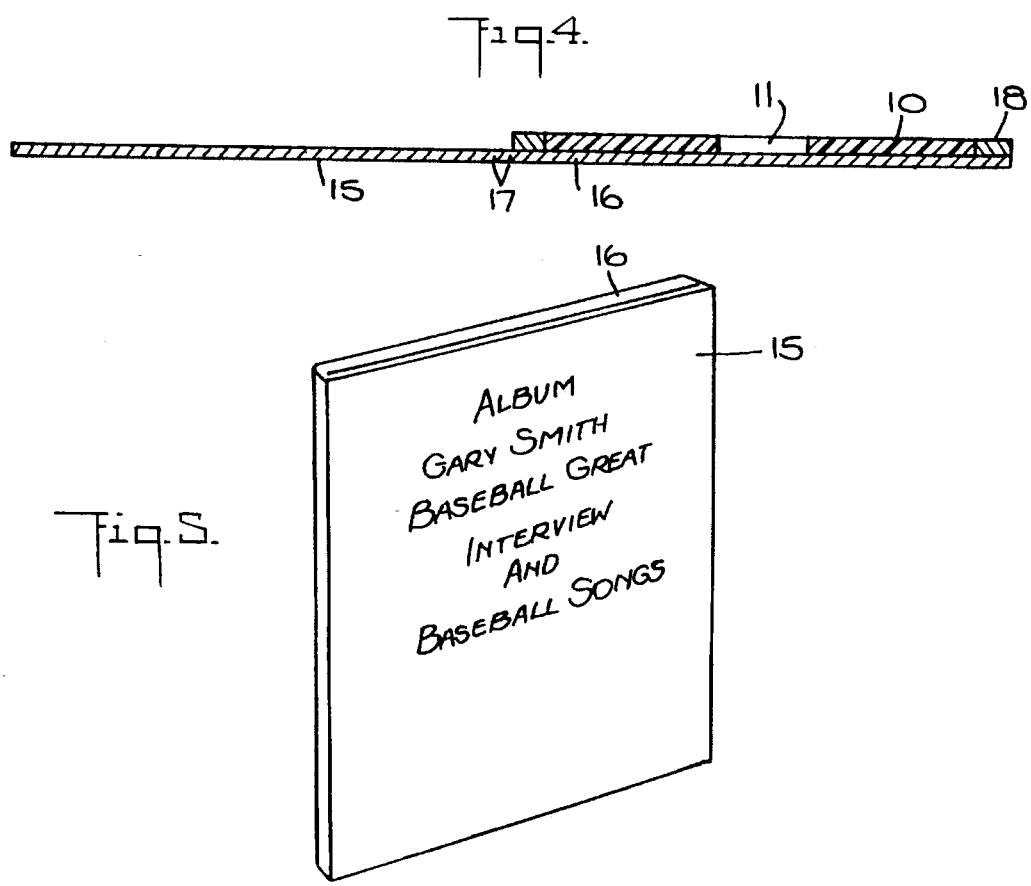

COMPACT DISC ALBUM

RELATED APPLICATION

This application is a continuation-in-part of my application Ser. No. 07/821,062, filed Jan. 16, 1992 now abandoned, entitled "Improved Compact Disc Package," which in turn is a continuation-in-part of my application Ser. No. 07/701,078, filed May 16, 1991, entitled "Compact Disc Package" (now U.S. Pat. No. 5,090,561). The entire disclosures of these applications are incorporated herein by reference.

BACKGROUND OF INVENTION

1. Field of Invention

This invention relates generally to packages for compact disc audio or video recordings and in particular to a compact disc package in an album format which serves to protectively store the disc.

2. Status of Prior Art

Digital techniques are now widely used to make sound and video recordings. Thus when recording music or speech, the analog signal output of the microphone amplifier is sampled and converted into a stream of digital bits that are recorded on magnetic tape and then transferred from the tape to a rotating master disc. The recording on the master disc is in the form of microscopic indentations in a spiral track on one surface of the disc. The master disc is used to create stampers for pressing vinyl records, called compact discs or CD's.

The player for a CD record uses a laser beam optical pick-up and makes no physical contact with the disc. A similar technique is used to make digital video recordings, the resultant video compact discs being referred to as VCD's. As used herein, the term "compact disc" encompasses both CD's and VCD's.

Compact discs are conventionally packaged in a so-called "jewel box" which consists of a rectangular casing having a hinged lid, the casing being molded of transparent, synthetic plastic material. The casing accommodates a plastic cassette in which the compact disc is held in place within the casing.

A conventional jewel box package, because of its relatively complex nature, is expensive to make and assemble. Moreover, the depth of the box for a compact disc is substantially greater than the thickness of the disc itself. This presents a problem; for in a typical retail establishment, shelf and counter space are at a premium, and the dimensions of a conventional jewel box compact disc package impose limits on the number of packages that can be kept in stock. This limitation also exists in home record libraries containing a multitude of compact discs.

Long-playing phonograph records whose diameter is much greater than that of a compact disc are often stored in an album. The album is provided with interhinged front and rear covers having paper sleeves bound between the covers into which the records are inserted. An album of this type is not only expensive to manufacture, but because of the sleeves they are somewhat difficult to load and unload, for each large diameter record must be inserted into a rectangular sleeve or removed therefrom. Since the sleeves are of paper, with continued use they tend to fray and tear.

In the package disclosed in my copending application Ser. No. 821,062 for a compact disc having impressed on one side thereof a sound or video recording (CD or VCD), the disc is nested in a circular well formed in a rectangular card having a backing sheet adhered thereto.

Printed on the printable unrecorded surface on the other side of the disc and in the region of the card surrounding this surface is a picture of a character who is related to the subject matter of the recording so that a portion of this picture appears on the printable surface of the disc, and the remainder on the card. Printed on the inner surface of the backing sheet in the region thereof encircled by the well is the same portion of the picture.

Hence when the compact disc is removed from the well in the card, one still sees the entire picture. The disc-loaded card is inserted in a transparent plastic sleeve having matching dimensions to provide a card-like package. To play the disc in an optical player, the card is removed from the sleeve and the disc withdrawn from the card.

A compact disc is often roughly handled, in the course of which it may be subjected to shocks as well as being exposed to contaminants. Unless a disc is protectively packaged, its quality may be impaired. While the conventional jewel box package for a compact disc affords adequate protection, it is not only expensive but, as noted previously, its space requirements create storage and shipping problems. Also it is bothersome to a user to remove a CD from a jewel box and to return it to the box after the CD is played. This is why CDs are often just piled up on a shelf or scattered rather than stored in jewel boxes in an organized library.

Another drawback of a conventional, transparent, plastic jewel box for a compact disc, is that data identifying the performers and the pieces recorded on the disc is printed on a small folder which is contained within the box and must be removed therefrom to be read. In the course of use, this folder is often misplaced

SUMMARY OF INVENTION

In view of the foregoing, the main object of this invention is to provide a simple and inexpensive package for a compact disc in an album format.

A significant advantage of this album is that it not only fully protects the compact disc stored therein against shock and contamination, but also makes it possible to readily withdraw the disc from the album and to return it to the album.

Another feature of the invention is that the album has opaque covers on which may be printed data identifying the pieces recorded on the compact disc and their performers.

Also an object of the invention is to provide an album for packaging a compact disc, the depth of the album being not much greater than the thickness of the disc so that the storage space requirements for the album are small as compared to a conventional jewel box package.

Briefly stated, these objects are attained in a protective package in an album format for a compact disc having a recording on one side thereof, the other side being unrecorded. The album is defined by interhinged rectangular front and rear cover panels of cardboard or other flexible material. Secured to the inner surface of the rear panel is a face panel having a circular opening die cut therein which is backed by the rear panel to create a well in which the compact disc is nested, with its recorded side lying against the rear panel, the unrecorded side being flush with the exposed surface of the face panel. When the front cover panel is folded over to close the album, the compact disc is then surrounded by the face panel and is sandwiched between the front and rear cover panel and is thereby fully protected. To remove the compact disc from the album, the front cover panel is unfolded and the rear cover panel is flexed to pop out the disc.

BRIEF DESCRIPTION OF DRAWINGS

For a better understanding of the invention as well as other objects and further features thereof, reference is made to the following detailed description to be read in conjunction with the accompanying drawings, wherein:

FIG. 3 illustrates an album in accordance with the invention, the front cover panel of which is folded out, the compact disc being seated within a circular well in a face panel laminated to the rear cover panel of the album;

FIG. 4 is a section taken through line 4—4 in FIG. 3;

FIG. 5 shows the album in its closed state; and

DESCRIPTION OF INVENTION

Figure 1:
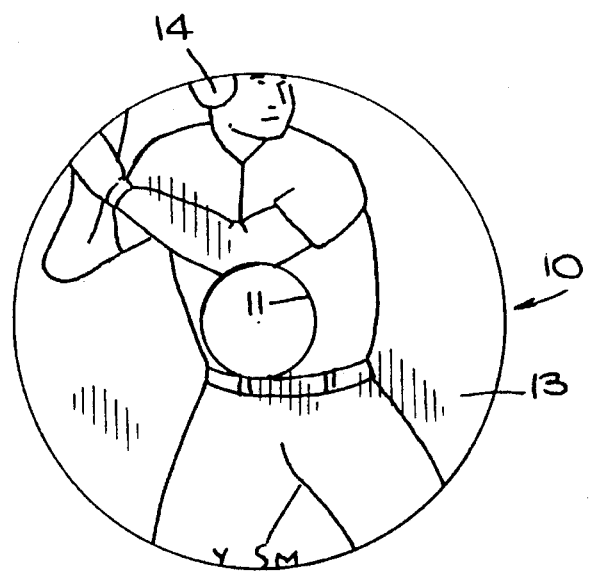
FIG. 1 illustrates the printable face on the unrecorded side of a compact disc included in a package in an album format in accordance with the invention.
Figure 2:
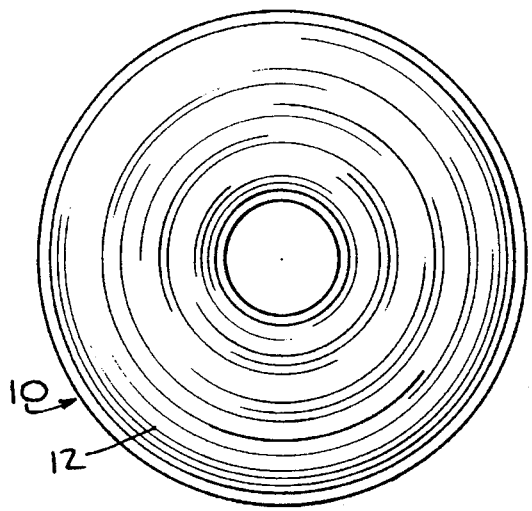
FIG. 2 shows the opposite, unrecorded side of the compact disc.

Referring now to FIGS. 1 and 2, there is shown a compact disc 10 having a center hub hole 11 so that the disc can be mounted on the spindle of an optical player for compact discs. The disc is formed of transparent, synthetic, plastic material whose recording side 12, as shown in FIG. 2, is provided with a spiral track that is coated with a reflective film.

We shall assume, by way of example only, that compact disc 10 has recorded thereon an interview with a famous baseball player known as GARY SMITH, the interview being followed by a series of musical pieces relating to baseball, such as "Take Me Out to The Ball Game" and "Casey at Bat."

Printed on the surface of a round piece of paper 13 adhered to the unrecorded side of compact disc 10 is a portion 14 of a picture of GARY SMITH. In practice, one may dispense with paper 13 and print directly on the unrecorded side of the disc.

The album for this disc, as shown in FIGS. 3 to 5, is constituted by a rectangular front cover panel 15 which is hinged to a rectangular cover panel 16. These panels may be formed from a single blank of cardboard or other flexible material, which is transversely scored to form parallel fold lines 17 creating a hinge which forms the spine of the album. Or the panels may be formed of a single blank of synthetic plastic material, such as PVC or polyethylene. In this instance, instead of fold lines, a living hinge is provided which interconnects the front and rear cover panels.

Laminated to the inner surface of rear cover panel 16 is a face panel 18 of the same dimensions as the rear cover panel and formed of the same or similar material. The thickness of face panel 18 matches the thickness of compact disc 10. Die cut in face panel 18 is a circular opening 19 which is backed by the inner surface of rear cover panel 16 to create a well in which compact disc 10 is snugly nested.

The recorded side of compact disc 10 lies against the inner surface of rear cover panel 16, while its unrecorded side lies flush with the exposed surface of face panel 18; hence the disc does not protrude from the well. Preferably, the cover panels are thinner than the face panel, so that when front cover panel 15 is folded over rear cover panel 16, a shown in FIG. 5, to close the album, the overall thickness of the album is not much greater than that of the disc, and the resultant package does not occupy much more space than the disc itself.

When the album is closed, as shown in FIG. 5, compact disc 10 is then surrounded by face panel 18 and is sandwiched between front and rear cover panels 15 and 16. The disc is now fully protected against shock and contaminants, no part of the disc being exposed.

Figure 6:
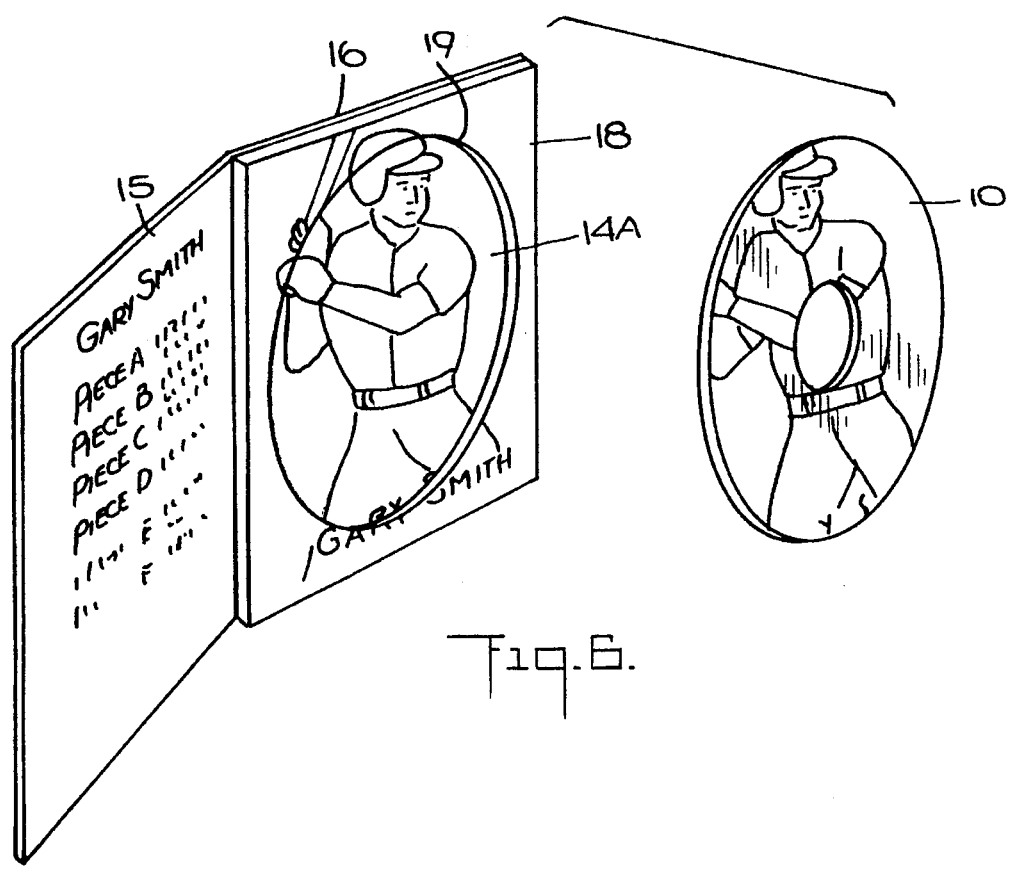
FIG. 6 illustrates the album in its open state with the compact disc removed therefrom.

When one wishes to remove compact disc 10 from the album, it is only necessary to unfold front cover panel 15, as shown in FIG. 6, and to then flex rear panel 16, this action causing the relatively stiff compact disc 10 to pop out of well 19 in which it is nested. To return the compact disc to the album, one has only to press it back into the well.

In practice, instead of a separate facing panel 18 laminated to rear cover panel 16 of the album, the faced panel may be integrated with the rear panel which is provided with a circular depression to define the well for nesting the compact disc.

As shown in FIG. 3, the picture of Gary Smith, a portion 14 which appears on the unrecorded face of compact disc 14 is completed on the exposed side of face panel 18. And, as shown in FIG. 6, the portion 14 of the picture which is printed on the disc is also printed as portion 14A on the inner surface of the rear cover panel, which is surrounded by the circular opening creating well 19.

Hence, whether the disc is nested in the well, as shown in FIG. 3, or removed from the well, as in FIG. 6, one sees the entire picture of the character or whatever other picture is printed on the face panel.

In practice, data relating to GARY SMITH (or whatever other character is the subject of the recording), and the pieces recorded on the disc may be printed on the inner surface of front cover panel 15 of the album, as shown in FIG. 3. And on the outer surface of the front cover panel, the identification of the compact disc packaged by the album may be printed, as shown in FIG. 5.

Also, dots 20 of pressure-sensitive adhesive may be coated on the corners on the inner surface of front cover panel 15, so that when this cover is folded over to engage face panel 18, it is maintained in this state.

In practice, the album need not be rectangular in shape, but can be cut to assume a decorative form, such as a heart shape or any other contoured form that is appropriate to the use to which the album is put. But whatever the form, the album must have a rear cover panel over which is a face panel having a circular opening to nest the compact disc, and the front cover panel, which has the same shape as the rear cover panel, must be hinged thereto. For example, the panels may be die cut to assume the contoured form of a human figure, the figure being that of the performer on the compact disc.

While there has been shown and described a preferred embodiment of a compact disc album in accordance with the invention, it will be appreciated that many changes and modifications may be made therein, without, however, departing from the essential spirit thereof.

I claim:

1. An album forming a protective package for a compact disc having a recording on one side, the other side of the disc being unrecorded, said disc being removable from the album so that it may be inserted in a compact disc player, said album comprising:

(a) a rectangular front cover panel hinged to a rectangular rear cover panel; and (b) a face panel overlying the inner surface of the rear cover panel and secured thereto, said face panel and said rear cover panel being formed of flexible material, said face panel having a circular opening therein which is backed by said rear cover panel to define a well, said opening having a diameter matching that of the disc whereby said disc is snugly nested in said well, whereby when the album is closed, said disc is surrounded by said face panel and is sandwiched between said front and rear cover panels, and when the album is open, the disc may be popped out by flexing the rear cover panel, the recording on one side of the disc being related to a character, such as a sports figure, the other side being printable, said face panel having a picture of the character printed thereon, a portion of which is printed on the printable surface of the disc, the same portion being printed on the inner surface of the rear cover panel surrounded by the opening.

2. An album as set forth in claim 1, wherein said face panel has a thickness matching that of the disc, whereby the recorded side of the disc lies against the inner surface of the rear panel and the unrecorded side lies flush with the face panel.

3. An album as set forth in claim 1, wherein the front cover panel and the rear cover panel are formed from a blank of cardboard having transverse fold lines creating a hinge and the spine of the album.

4. An album as set forth in claim 3, wherein said face panel is formed of cardboard and is laminated to said rear panel.

5. An album as set forth in claim 1, wherein the front cover panel and the rear cover panel are formed from a blank of synthetic-plastic, flexible material having a living hinge to interhinge the front cover panel to the rear cover panel.

6. An album as set forth in claim 5, wherein said face panel is formed of the same material as the rear cover panel and is integrated therewith.

7. An album as set forth in claim 1, wherein said other side of the disc has a round sheet of paper adhered thereto on which said portion of the picture is printed.

* * * * *